US012728420B2

(12) United States Patent
Yoo

(10) Patent No.: US 12,728,420 B2
(45) Date of Patent: Sep. 8, 2026

(54) PCR DISC APPARATUS USING MICRO-NEEDLE TUNNELLING CHANNEL AND ANALYSIS METHOD USING THE SAME

(71) Applicant: RESEARCH & BUSINESS FOUNDATION SUNGKYUNKWAN UNIVERSITY, Suwon-si (KR)

(72) Inventor: Jae-Chern Yoo, Gwacheon-si (KR)

(73) Assignee: RESEARCH & BUSINESS FOUNDATION SUNGKYUNKWAN UNIVERSITY, Suwon-si (KR)

( * ) Notice: Subject to any disclaimer, the term of this patent is extended or adjusted under 35 U.S.C. 154(b) by 605 days.

(21) Appl. No.: 18/220,085

(22) Filed: Jul. 10, 2023

(65) Prior Publication Data

US 2024/0009671 A1 Jan. 11, 2024

(30) Foreign Application Priority Data

Jul. 11, 2022 (KR) ........................ 10-2022-0084850

(51) Int. Cl.
*B01L 3/00* (2006.01)

(52) U.S. Cl.
CPC ..... *B01L 3/50851* (2013.01); *B01L 2200/147* (2013.01); *B01L 2300/0816* (2013.01); *B01L 2300/1822* (2013.01)

(58) Field of Classification Search
None
See application file for complete search history.

(56) References Cited

U.S. PATENT DOCUMENTS 3,335,946 A 8/1967 Putterlik
10,265,696 B2 4/2019 Yoo
10,583,433 B2 3/2020 Yoo

FOREIGN PATENT DOCUMENTS

GB 1075800 A 7/1967
JP 3041423 B1 5/2000
KR 10-0830926 B1 5/2008
KR 10-0855996 B1 9/2008
KR 10-2011-0073381 A 6/2011
KR 10-2014-0092753 A 7/2014
KR 10-2019-0074733 A 6/2019
WO WO 2015/048798 A1 4/2015

OTHER PUBLICATIONS

Espacenet_English_Translation_of_KR20190074733A (Year: 2019).*
Ko et al., Non-contact temperature control system applicable to Polymerase Chain Reaction on lab-on-a-disc, Sensors 2019, 19, pp. 1-9. (Year: 2019).*

* cited by examiner

*Primary Examiner* — Kathryn Elizabeth Limbaugh

(57) ABSTRACT

The present invention relates to a polymerase chain reaction (hereinafter, referred to as 'PCR') disc apparatus for performing a PCR on a compact disc and an analysis method using the same, more specifically to a PCR disc apparatus and an analysis method using the same that are capable of allowing micro-needle tunnelling channels and different types of chambers to be integratedly arranged on a compact disc to perform DNA or RNA amplification, so that in a situation such as Coronavirus disease pandemic, a user can perform PCR analysis of non-face-to-face easily even at home to permit a doctor to remotely check PCR analysis results through the Internet network.

16 Claims, 9 Drawing Sheets

Top view Sectional view taken along the line b-b'

PCR DISC APPARATUS USING MICRO-NEEDLE TUNNELLING CHANNEL AND ANALYSIS METHOD USING THE SAME

CROSS-REFERENCE TO RELATED APPLICATIONS

The present application claims the benefit of Korean Patent Application No. 10-2022-0084850 filed in the Korean Intellectual Property Office on Jul. 11, 2022, the entire contents of which are incorporated herein by reference.

BACKGROUND

1. Field

The present invention relates to a polymerase chain reaction (hereinafter, referred to as 'PCR') disc apparatus for performing a PCR on a compact disc and an analysis method using the same, more specifically to a PCR disc apparatus and an analysis method using the same that are capable of allowing micro-needle tunnelling channels and different types of chambers to be integratedly arranged on a compact disc to perform DNA or RNA amplification, so that in a situation such as Coronavirus disease pandemic, a user can perform PCR analysis of non-face-to-face easily even at home to permit a doctor to remotely check PCR analysis results.

2. Description of the Related Art

A molecular diagnosis method using nucleic acids has some advantages such as high accuracy, reproducibility, and speed, and accordingly, the molecular diagnosis method has been recently popular in food hygiene and forensic medicine fields. In spite of such advantages of the molecular diagnosis method, however, additional measurement equipment has to be needed in performing the molecular diagnosis. Therefore, these days, many studies of the molecular diagnosis using a lab-on-a-disc have been made.

The lab-on-a-disc is a device in which chambers for performing different processes and hole valves for controlling the flow of a fluid are arranged on a disc to allow a sample introduced in a sample inlet to move to channels through a centrifugal force, which is disclosed in European Patent No. GB1075800 (Publication date Jul. 12, 1967) entitled "Disc for centrifuge" and European Patent No. 3,335,946 (on Apr. 12, 1965) entitled "Separating disks for centrifuge".

However, the biggest problem occurring in performing the molecular diagnosis method using nucleic acids on the lab-on-a-disc is the integration of PCR process on the disc.

The PCR process is carried out by repeating a thermocycle consisting of denaturation (at 95° C.), annealing (at 50° C.), and extension (at 72° C.) in a PCR chamber, and if the PCR process is performed in the lab-on-a-disc, first, it is necessary to hold the sample in PCR chamber under high temperature and high pressure vapor generated from the denaturation (at 95° C.). Up to now, however, it is impossible to mount a valve resistant to a high temperature (about 100° C.) vapor pressure onto the lab-on-a-disc.

To perform the integration of the PCR process on the disc, that is, there is a need to develop a valve that holds the sample in the PCR chamber even under the vapor pressure conditions of high temperature (about 100° C.) and high pressure, but existing hole valves fail to satisfy such a need.

To solve such a problem, the present invention proposes a micro-needle tunnelling channel. As the micro-needle tunnelling channel is entirely closed, the physically closed length thereof is longer than that of the existing hole valve, which is very advantageous in withstanding high temperature and high pressure.

SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

Accordingly, the present invention has been made in view of the above-mentioned problems occurring in the related art, and it is an object of the present invention to provide a PCR disc apparatus that is capable of using a micro-needle tunnelling channel for preventing a sample in a PCR chamber from leaking to the outside even under high temperature and high pressure generated during PCR amplification. In specific, it is an object of the present invention to provide a PCR disc apparatus that is capable of allowing a micro-needle to be built in a melted black thermoplastic resin, filling and hardening an inlet chamber of the PCR chamber, escaping the micro-needle from the black thermoplastic resin by means of the strong centrifugal force generated by the rotation of the disc to form the micro-needle tunnelling channel made of the black thermoplastic resin on the inlet chamber of the PCR chamber, moving the sample to be amplified to the interior of the PCR chamber through the micro-needle tunnelling channel, melting the black thermoplastic resin through laser heating to allow the micro-needle tunnelling channel to be melted to close the inlet chamber of the PCR chamber, and holding the sample in the PCR chamber, thereby preventing the escape of the sample due to the high temperature and high pressure generated during the PCR process.

It is another object of the present invention to provide an analysis method using the above-mentioned PCR disc apparatus.

According to the present invention, desirably, a PCR disc is a polycarbonate or cyclic olefin copolymer (COC) disc.

Hereinafter, deoxyribonucleic acid (DNA) in the present invention is any one sample selected from a deoxyribonucleic acid sample obtained from a sample such as pathogen, virus, a body part (hair, flesh, etc.), secretions (saliva, urine, etc.) of plants or animals, blood, or food and a complementary DNA (cDNA) sample obtained by the reverse transcription from ribonucleic acid (RNA).

The pathogen is desirably obtained by taking 25 g of food according to Korean Food Standards Codex or an FDA food code in America, putting the food into a 225 ml of liquid medium suitable for target pathogen, performing homogenization and enrichment culture for 18 to 24 hours, and obtaining the homogenized pathogen by means of centrifugal separation and a porous filter by using pathogen colony with the separate culture from a selective agar medium suitable for the target pathogen, a pellet of the pathogen obtained through centrifugal separation after the enrichment culture suitable to the target pathogen, or a Stomacher of food.

Hereinafter, the term "disc" in the present invention may be used together with "PCR disc".

Hereinafter, DNA amplification in the present invention may be a process of amplifying the DNA contained in a sample and includes a thermos cycle of PCR.

According to the present invention, a fluid may move along a channel by means of the centrifugal force generated by the rotation of the disc.

According the present invention, a black thermoplastic resin may be desirably made of a black dye or VANTA black powder mixed with one material selected from ethylene vinyl acetate (EVA), polyethylene, polyvinyl chloride, thermoplastic epoxy resin, polyurethane, polyolefin, polyamide, styrenic interpolymer, polyester, hot melt resin, and a thermoplastic material.

To accomplish the above-mentioned objects, according to the present invention, there is provided a PCR disc apparatus including a PCR disc, a driving controller having a motor adapted to rotate the PCR disc and stop rotating the PCR disc, a laser heating device for heating a PCR chamber on the PCR disc, and a non-contact temperature sensor for measuring an internal temperature of the PCR chamber on the outside of the PCR disc, wherein the PCR disc may include a sample inlet for introducing a sample, a sample chamber connected to the sample inlet to temporarily store the sample, an outlet connected to the sample chamber to allow the sample to be gently introduced in the sample chamber, without any introduction pressure (resistance), when the sample is introduced through the sample inlet, the PCR chamber for performing DNA amplification and storing enzymes for supporting the DNA amplification, a micro-needle tunnelling channel for providing a connection path between the sample chamber and the PCR chamber, a metering channel for providing a connection path to an excess chamber for storing an excess of the sample that is a larger amount than a fixed amount of sample in the PCR chamber, a heating film stored in the PCR chamber to absorb the heat generated from the laser heating device or transfer the absorbed heat to the interior of the PCR chamber, and a temperature expression member for expressing the internal temperature of the PCR chamber through changes in color or emission of infrared light.

A micro-needle may be built in a melted black thermoplastic resin on an inlet chamber of the PCR chamber, the inlet chamber of the PCR chamber may be filled and hardened with the melted black thermoplastic resin, and the micro-needle may escape from the black thermoplastic resin by means of the strong centrifugal force generated by the rotation of the disc, so that the micro-needle tunnelling channel may be formed on the inside of the black thermoplastic resin on the inlet chamber of the PCR chamber.

That is, the micro-needle may be built in the black thermoplastic resin on the inlet chamber of the PCR chamber in such a way as to pass through the black thermoplastic resin, and as the micro-needle escapes from the black thermoplastic resin, the micro-needle tunnelling channel may be formed on the inside of the black thermoplastic resin.

The PCR disc according to the present invention may move the sample introduced in the sample chamber through the sample inlet to the interior of the PCR chamber through the micro-needle tunnelling channel by means of the centrifugal force generated by the rotation of the motor and melt and close the micro-needle tunnelling channel made of the black thermoplastic resin through laser heating to allow the sample to be held in the PCR chamber, thereby preventing the sample from escaping from the PCR chamber due to the high temperature and high pressure generated during the PCR process.

Before the DNA amplification, that is, the sample introduced in the sample chamber may move to the PCR chamber through the micro-needle tunnelling channel by means of the centrifugal force, and after the excess of the sample over the fixed amount of sample of the PCR chamber is transferred to the excess chamber, the black thermoplastic resin may be melted by means of the laser heating to close the micro-needle tunnelling channel. Next, the DNA amplification may be performed.

According to the present invention, further, peptide nucleic acid (PNA) probes may be disposed in the PCR chamber, and accordingly, the DNA amplification in the present invention desirably may perform a hybridization reaction for coupling PNA and DNA to each other through the hybridization with specific sequences of DNA moving to the PCR chamber through the micro-needle tunnelling channel. Desirably, PNA may be coupled to normal DNA having normal target sequence and not coupled to DNA having mutated target sequence.

In this case, the normal DNA coupled to the PNA may not be amplified, and the mutated target DNA not coupled to the PNA may be amplified in large quantities during the DNA amplification to thus determine whether a disease exists and a mutation occurs.

More desirably, further, fluorescent labels for emitting different colors according to adjustment of different DNA melting/denaturation temperatures and a plurality of different target sequences may be attached to the PNA probes to permit multiplexing target detection for detecting a plurality of targets from a single reaction. The fluorescent labels may include fluorescent reporters labelled on one side terminal of the PNA probes and quenchers labelled on the other side terminal thereof.

In this case, if the target sequence does not exist in the DNA moving to the PCR chamber through the micro-needle tunnelling channel, a physical distance between the fluorescent reporter and the quencher of each PNA probe may be very close so that fluorescence may not be generated. Contrarily, if the target sequence exists in the DNA moving to the PCR chamber through the micro-needle tunnelling channel, the PNA probes may be hybridized with the targe sequence in the annealing process of the thermocycle of the PCR, and in this case, the physical distance between the fluorescent reporter and the quencher may become distant to cause no quenching anymore, so that the fluorescent light generated from the fluorescent reporter may be observed by means of a fluorescent sensor to allow a DNA amplified product to be analyzed quantitatively and qualitatively.

According to the present invention, desirably, the temperature expression member may be any one selected from micro-encapsulated temperature sensitive materials and an infrared radiation plate.

According to the present invention, desirably, the non-contact temperature sensor may be any one selected from an image sensor for detecting changes in transparency and colors of the micro-encapsulated temperature sensitive materials and an infrared sensor for detecting an amount of infrared light emitted from the infrared radiation plate.

The micro-encapsulated temperature sensitive materials may be changed in molecular structures of materials inside capsules to cause the materials to be changed in transparency and colors.

Desirably, the micro-encapsulated temperature sensitive materials may be mixed with a transparent water or oil paint and then coated onto the PCR chamber, and in this case, the internal temperature of the PCR chamber may be detected by the image sensor on the outside in a non-face-to-face way.

According to the present invention, desirably, the image sensor may detect changes in transparency and colors of the micro-encapsulated temperature sensitive materials according to temperatures to thus measure the internal temperature of the PCR chamber.

The infrared sensor may be a temperature sensor that collects the infrared energy emitted from a measurement target object to an infrared lens, detects the collected infrared energy, and measures the temperature of the object in a non-face-to-face way, and accordingly, the infrared sensor may detect an amount of infrared light emitted from the infrared radiation plate according to the internal temperature of the PCR chamber and thus measure the internal temperature of the PCR chamber.

According to the present invention, desirably, the infrared radiation plate may be a metal sheet coated with a black color. Further, one surface of the metal sheet may come into direct contact with the inside of the PCR chamber, and the surface opposite to one surface may measure the internal temperature of the PCR chamber by means of the infrared sensor.

Further, the metal sheet has a high heat transfer rate, and the black paint coated on the metal sheet maximizes an infrared radiation rate, so that the internal temperature of the PCR chamber may be accurately measured through the infrared sensor.

According to the present invention, desirably, the micro-encapsulated temperature sensitive materials may be encapsulated in such a way as to have thermochromic dyes as cores thereof disposed at the centers of the interiors of the capsules and polymers coated on the outer surfaces of the thermochromic dyes, and more desirably, each micro-encapsulated temperature sensitive material may have a diameter of 1 nm to 10 μm. The micro-encapsulated temperature sensitive materials may be waterproof by means of the polymer coating on the outsides thereof and thus not mixedly melted with the sample even in the PCR chamber, so that they may become the temperature expression member for stably expressing temperature changes in the PCR chamber through changes in transparency or colors to the outside.

The polymer coated on the outer surfaces of the thermochromic dyes may be selected from polystyrene, polymethyl methacrylate, epoxy, urea resin, polyester, polyamide, polyurethane, polyethylene, polyvinyl alcohol, polyoxymethylene melamine, gelatine, cellulose, and a combination thereof.

According to the present invention, desirably, the PCR disc apparatus may include the image sensor for detecting the changes in transparency and colors of the micro-encapsulated temperature sensitive materials coated onto the inside of the PCR chamber to measure the internal temperature of the PCR chamber and a central processing unit for performing feedback control for the laser heating device and a cooling device to allow the PCR chamber to be heated to an optimal temperature at which the DNA amplification is performed.

According to the present invention, desirably, the thermochromic dyes may be selected from phase change materials, leuco dye mixtures that are colorless or off-white but they are coupled to organic acids to emit colors, mixtures of diphenyl aminophenol as a coloring agent and toluidine as a color developer, and mixtures of terephthaloyl acetanilide as a coloring agent and aminoazobenzene as a color developer.

According to the present invention, desirably, the thermochromic dyes may be desirably the mixtures of a coloring agent such as diphenyl aminophenol or terephthaloyl acetanilide and a color developer such as toluidine or aminoazobenzene.

According to the present invention, desirably, the thermochromic dyes may further include paraffin materials such as eicosane, nonadecane, and the like.

According to the present invention, desirably, the thermochromic dyes may be leuco dyes that are made by mixing at least one or more materials selected from the group consisting of triarylmethane dyes such as 3,3-bis(p-dimethylamino phenyl)-6-demethylamino phthalate, 7'-anilino-3'-debutylamino-6'-methylfluorene, 3-(p-dimethylamino phenyl)-3-(1,2-demethyl 3-indolyl) phthalate,3,3-bis(9-ethyl-3-carbazolyl)-5-demethylamino phthalate, or 3,3-bis(2-phenyl-3-indolyl)-5-demethylamino phthalate, diphenyl dyes such as 4,4'-bis(dimethylaminobenzyhydryl)benzyl ether, ere, thiazin dyes such as benzoyl leuco methylene blue, Spiro dyes such as 3-methylspiro dinaphthopyrene, fluorene dyes, leuco auramine dyes, indolyl dyes, and indigo dyes.

The leuco dye is colorless or off-white at a room temperature, and when heated, it reacts with organic acids to emit color. The leuco dye is used alone or two types of leuco dyes are mixedly used.

The organic acids added to cause the reaction with the leuco dyes may include one or two types of diphenyl sulfone derivatives selected from the group consisting of 4-hydroxydiphenyl sulfone derivative and 4,4'-dihydroxydiphenyl sulfone, 2,4'-dihydroxydiphenyl sulfone, and 4-hydroxydiphenyl sulfone derivative, and further, they may include 4-substituted biphenyl derivative.

Desirably, the phase change material may be paraffin or non-paraffin as an organic material and an ionic compound or metal as an inorganic material.

According to the present invention, desirably, the laser heating device may be an infrared laser that emits light with infrared wavelength. The infrared wavelength is absorbed most by black color.

Through the laser heating device having infrared wavelength region, accordingly, the black thermoplastic resin with the micro-needle tunnelling channel formed therein may be easily melted so that the micro-needle tunnelling channel may be closed.

According to the present invention, desirably, the heating film may be selected from a black film, a Vertically Aligned Nano Tube Arrays (VANTA) black sheet, a metal sheet, and a graphite sheet. The metal sheet has a black surface coated with black paint or VANTA black and is thus heated by the laser heating device. The black coated surface efficiently absorbs the light generated from the laser heating device, and further, since the metal sheet has a high heat transfer rate, it transfers the heat generated by the laser to the PCR chamber to evenly heat the sample in the PCR chamber. The VANTA black sheet has arrangements of vertically aligned nanotubes, and most of light received through repeated reflection between the nanotubes are absorbed, without being no emitted to the outside. The VANTA black sheet has the carbon nanotubes with a diameter of 1 to 2 nm and almost absorbs 99.97% of the light with visible light and infrared light regions. The heating film desirably may have a thickness of 0.01 to 0.1 mm.

The metal sheet may be desirably made of aluminum or metal with a thickness of 0.01 to 0.1 mm.

According to the present invention, the graphite sheet has high thermal conductance and is a black color, so that the graphite sheet may easily absorb the heat generated from the laser heating device to allow the absorbed heat to be transferred to the PCR chamber, thereby evenly heating the sample in the PCR chamber.

The black film may absorb the laser light generated from the laser heating device and thus heat the PCR chamber, so that the DNA amplification may be performed.

The black film (black sheet) may be desirably a heat-resistant film that is not melted by the laser heating device.

The heat-resistant film may be desirably selected from an aramid film, a polyethylene terephthalate film, and a polyimide film.

According to the present invention, desirably, the PCR disc may further include an additional chamber for storing a buffer solution containing various enzymes such as dNTP, primer, and the like to perform the PCR amplification or storing polymerase.

According to the present invention, the enzymes as needed for the DNA amplification may be subjected to freeze drying and thus stored in the shapes of tablets in the PCR chamber, and the tablets may be liquefied by the sample introduced in the PCR chamber through the micro-needle tunnelling channel, so that the DNA amplification may be performed.

According to the present invention, the DNA amplification may be made by repeatedly performing the PCR thermocycle, and otherwise, it may be made by isothermal amplification.

Desirably, the DNA amplification using the PCR thermocycle may be made by performing the thermocycle consisting of denaturation (at 95° C.), annealing (at 50° C.), and extension (at 72° C.) in which the three temperatures or two selected temperatures are periodically repeated in the PCR chamber.

Desirably, the heating operation of the PCR thermocycle may be performed by heating the heating film by means of the laser heating device and thus heating the PCR chamber, and a cooling operation of the PCR thermocycle may be performed by cooling the PCR chamber by means of a cooling device.

Desirably, the cooling operation of the cooling device may be performed by cooling the PCR chamber by the cold air generated from a rotation fan connected to the cold surface of a Peltier element.

According to the present invention, the PCR disc apparatus may further include a fluorescent sensor or optical sensor for analyzing a DNA amplified product quantitatively and qualitatively.

Desirably, the fluorescent sensor may make use of a primer labelled with a fluorescent material as a kind of fluorescent dye such as FAM, TAMRA, and the like through a fluorescence resonance energy transfer (FRET) method, and thus check whether real time DNA amplification is performed, without any separate fluorescent material, thereby measuring the DNA amplified product quantitatively and qualitatively.

According to the present invention, desirably, the driving controller may include a turn table for placing the PCR disc thereon and the motor for rotating the PCR disc placed on the turn table.

According to the present invention, desirably, the PCR disc may have a diameter of 120, 80, 60, or 32 mm and a thickness of 1 to 20 mm.

According to the present invention, desirably, the optical sensor may be desirably any one selected from a photodiode, a camera, a photodiode array, a spectrometer, a charge-coupled device (CCD), an image sensor, a laser power meter, and a fluorescent sensor.

The optical sensor may detect the transparency and color changes of the micro-encapsulated temperature sensitive materials disposed in the PCR chamber to thus measure the internal temperature of the PCR chamber. Further, the optical sensor may analyze the DNA amplified product quantitatively and qualitatively.

According to the present invention, desirably, the PCR disc may be made of one or more materials selected from the group consisting of a silicon wafer, acryl, polypropylene, polyacrylate, polymethyl methacrylate, cyclic olefin copolymer (COC), and polycarbonate. However, the PCR disc may be made of a plastic because of many economical advantages and machining easiness.

According to the present invention, the PCR disc desirably may consist of an upper substrate, an intermediate substrate, and a lower substrate, and the substrates may be attached to one another by means of adhesives.

According to the present invention, the PCR disc may be desirably configured to allow the upper substrate, the intermediate substrate, and the lower substrate to be laminatedly bonded to one another by means of a double coated adhesive tape.

The double coated adhesive tape may be release paper such as paper, vinyl, a polyester film, a polyethylene film, and other synthetic materials that is subjected to surface treatments in such a way as to have both surfaces coated with an adhesive or gluing agent, and according to the conditions as required, the material of the adhesive may be selected to have the characteristics of high sealing and buffering, vibration suppression, impact resistance, absorption, adhesion, and the like.

According to the present invention, the adhesive or gluing agent itself may be used as the double coated adhesive tape, without having any release paper or backing.

Desirably, the double coated adhesive tape may be the release paper whose both surfaces are coated with the adhesive, or the adhesive or gluing agent may be used as the double coated adhesive tape, without any release paper. The adhesive may be selected from a hot melt adhesive, a silicone adhesive, a modified silicone adhesive, an acrylic-based adhesive, a polyamide adhesive, a polyolefin adhesive, a Teflon adhesive, polyester adhesive, an epoxy, a UV curable adhesive, a UV adhesive, a thermoplastic resin, and the like.

According to the present invention, desirably, the PCR disc apparatus may further include a display device for displaying the quantitative and qualitative analysis results of the DNA amplified product thereon or remotely transmitting the DNA analysis results to a medicine specialist through the internet.

BRIEF DESCRIPTION OF THE DRAWINGS

These and/or other aspects of the disclosure will become apparent and more readily appreciated from the following description of the embodiments, taken in conjunction with the accompanying drawings of which.

Throughout the drawings and the detailed description, the same reference numerals may refer to the same, or like, elements. The drawings may not be to scale, and the relative size, proportions, and depiction of elements in the drawings may be exaggerated for clarity, illustration, and convenience.

DETAILED DESCRIPTION

Figure 1A:
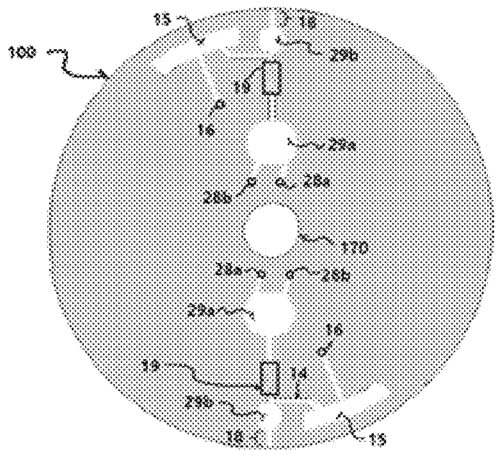
FIGS. 1A to 1C are exemplary views showing an embodiment of the present invention in which sample chambers, micro-needle tunnelling channels, and PCR chambers are integratedly arranged on a PCR disc to perform DNA amplification.

The present invention is disclosed with reference to the attached drawings to allow embodiments to be carried out easily by those skilled in the art. The present invention may be modified in various ways and may have several exemplary embodiments. However, this does not limit the invention within specific embodiments. In order to facilitate the general understanding of the present invention in describing the present invention, through the accompanying drawings, the same reference numerals will be used to describe the same components.

When it is said that one element is described as being "connected" or "coupled" to the other element, one element may be directly connected or coupled to the other element, but it should be understood that another element may be electrically connected between the two elements.

In the description, when it is said that one member is located "above" or "under" another member, it means that one member may come into contact with another member as well as yet another member may exist between the two members.

In the description, when it is said that one portion is described as "includes" any component, one element further may include other components unless no specific description is suggested.

In the description, the term, "about", "substantially", and the like is referred to as being closed to a given numerical value when an inherent manufacturing and material allowance error is suggested, which prevents an accurate or absolute numerical value as mentioned herein from being unfairly used by a conscienceless infringer. In the description, further, the term, "step of doing" or "step of something" does not mean "step for something".

In the description, the term, "a combination thereof" contained in a Markush type expression means one or more mixture or combination selected from the group consisting of components described in the Markush type expression, that is, one or more materials selected from the group consisting of the components.

In the description, if a composition is described as containing components A and/or B, the composition can contain A alone; B alone; or A and B in combination.

Hereinafter, an explanation of an embodiment of a PCR disc apparatus according to the present invention will be given in detail with reference to the attached drawings. However, the present invention may not be limited to the embodiment and the drawings as will be explained below.

Figure 1B:
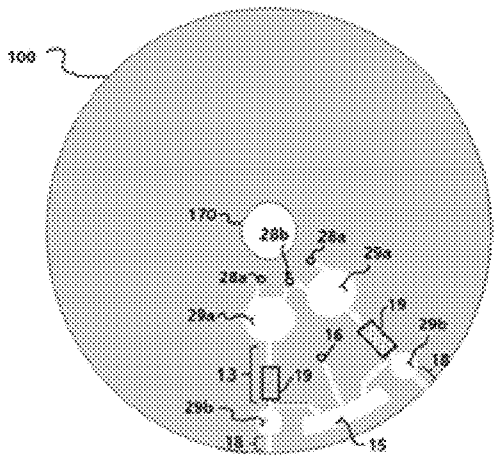
Figure 1C:
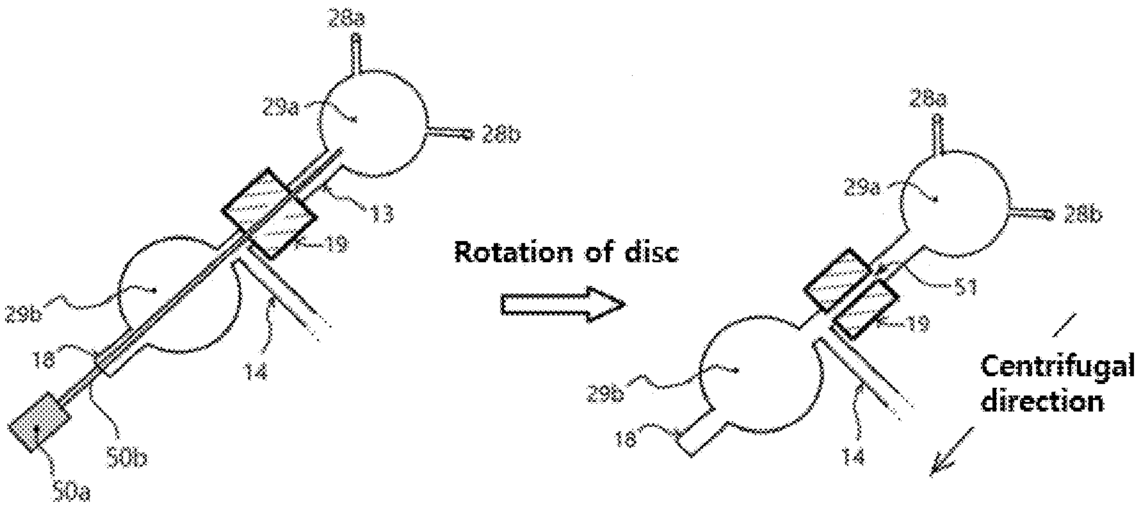

FIGS. 1A to 1C are exemplary views showing an embodiment of the present invention in which sample chambers 29*a*, micro-needle tunnelling channels 51, and PCR chambers 29*b* are integratedly arranged on a PCR disc 100 to perform DNA amplification.

In specific, the PCR disc 100 includes a sample inlet 28*a* for introducing a sample, a sample chamber 29*a* connected to the sample inlet 28*a* to temporarily store the sample, an outlet 28*b* connected to the sample chamber 29*a* to allow the sample to be gently introduced in the sample chamber 29*a*, without any introduction pressure (resistance), when the sample is introduced through the sample inlet 28*a*, at least one or more PCR chambers 29*b* performing DNA amplification and storing enzymes for supporting the DNA amplification, a micro-needle tunnelling channel 51 for providing a connection path between the sample chamber 29*a* and the PCR chamber 29*b*, a metering channel 14 for providing a connection path to an excess chamber 15 for storing an excess of the sample that is a larger amount than a fixed amount of sample of the PCR chamber 29*b*, a heating film 30*b* stored in the PCR chamber 29*b* to absorb the heat generated from a heating device or transfer the absorbed heat to the interior of the PCR chamber 29*b*, and a temperature expression member 24*b* for expressing the internal temperature of the PCR chamber 29*b* through the changes in color or the emission of infrared light. The sample introduced through the sample inlet 28*a* is first filled into the PCR chamber 29*b*, and after that, the excess of the sample is sent to the excess chamber 15 through the metering channel 14. In specific, the sample introduced through the sample inlet 28*a* passes through the micro-needle tunneling channel 51 and then filled into the PCR chamber 29*b*, and after that, the excess of the sample is sent to the excess chamber 15.

A reference numeral 170 represents a disc hole for connecting the disc 100 to a turn table when the disc 100 rotates. A reference numeral 16 represents an outlet of the excess chamber 15.

A reference numeral 18 represents an outlet of a micro-needle, through which the micro-needle is drawn from a black thermoplastic resin 19 by means of a centrifugal force.

After the micro-needle has been drawn by means of the centrifugal force, the micro-needle outlet 18 is sealed, and according to the present invention, it is desirably sealed using a UV adhesive.

To move the sample to be amplified to the PCR chamber 29*b*, the PCR disc 100 transfers the sample introduced in the sample chamber 29*a* through the sample inlet 28*a* to the PCR chamber 29*b* via the micro-needle tunnelling channel 51 by means of the centrifugal force generated by the rotation of a motor, melts the block thermoplastic resin 19 by means of laser heating to hold the sample in the PCR chamber 29*b* before the DNA amplification, and closes the micro-needle tunnelling channel 51, so that the sample can be prevented from leaking from the PCR chamber 29*b* due to the high pressure and high heat generated during the DNA amplification.

The PCR disc 100 as shown in FIG. 1A shows two pairs of structures symmetrically disposed thereon, so that through the symmetrical arrangements, the whole weight of the disc 100 is balanced upon the rotation of the disc 100, thereby advantageously minimizing the vibrations and noise generated when the disc 100 rotates at a high speed.

The PCR disc 100 as shown in FIG. 1B shows two pairs of structures disposed adjacent to each other, so that through the adjacent arrangements, the outlet 28*b* and the excess chamber 15 are shared, thereby advantageously minimizing a design area of the disc 100.

FIG. 1C shows a process of forming the micro-needle tunnelling channel 51.

A left figure of FIG. 1C shows a state in which a micro-needle 50*b* is built in the melted black thermoplastic resin 19 and a portion of a connection path 13 between the sample chamber 29*a* and the PCR chamber 29*b* is filled and hardened.

Contrarily, a right figure of FIG. 1C shows a state in which the micro-needle 50*b* as shown in the left figure of FIG. 1C escapes from the black thermoplastic resin 19 by means of the strong centrifugal force generated by the rotation of the disc 100 to allow the micro-needle tunnelling channel 51 to be formed in the black thermoplastic resin 19.

FIGS. 2A to 2D are exemplary views showing the processes of forming the micro-needle tunnelling channel 51 and performing the DNA amplification according to the present invention.

According to the present invention, the PCR disc 100 desirably has a body consisting of an upper substrate 100*a*, an intermediate substrate 100*b*, and a lower substrate 100*c*, and the substrates form the channels 13 and 14 through which a fluid flows, the sample chamber 29*a*, the PCR chamber 29*b*, and the excess chamber 15 on the surfaces thereof during plastic injection molding. Desirably, the substrates are attached to one another by means of adhesive tapes to provide the single PCR disc 100. To measure the changes in temperature of the PCR chamber 29*b* on the outside, further, the temperature expression member 24*b* is disposed inside the PCR chamber 29*b* to express a temperature value through the changes in transparency or colors or an amount of infrared light emitted according to the increasing or decreasing temperature of the PCR chamber 29*b*. Further, the heating film 30*b* is disposed inside the PCR chamber 29*b* to absorb the heat generated from a laser heating device 44 or transfer the absorbed heat to the interior of the PCR chamber 29*b*.

The PCR disc apparatus according to the present invention includes the laser heating device 44 for heating the PCR chamber 29*b* on the PCR disc 100 and a non-contact temperature sensor 46*a* for measuring the changes in transparency or color or the amount of infrared light emitted that are expressed by means of the temperature expression member 24*b*.

FIGS. 2A to 2D are top and sections taken along the line b-b' showing the method for forming the micro-needle tunnelling channel 51 and the PCR chamber 29*b* for performing the DNA amplification.

Figure 2A:
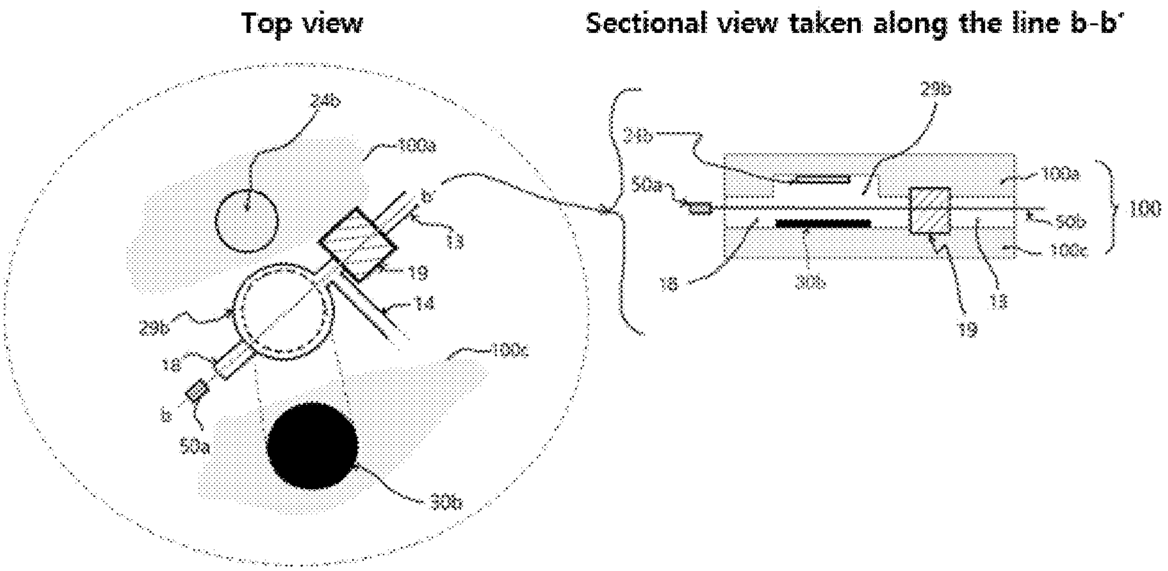
FIGS. 2A to 2D are exemplary views showing the processes of forming the micro-needle tunnelling channel and performing the DNA amplification according to the present invention.

FIG. 2A shows a state in which the micro-needle 50*b* is built in the melted black thermoplastic resin 19 and a portion of the connection path 13 between the sample chamber 29*a* and the PCR chamber 29*b* is filled and hardened. In this case, a head 50*a* of the micro-needle 50*b* protrudes outward from the micro-needle outlet 18 to the outside of the disc 100.

Figure 2B:
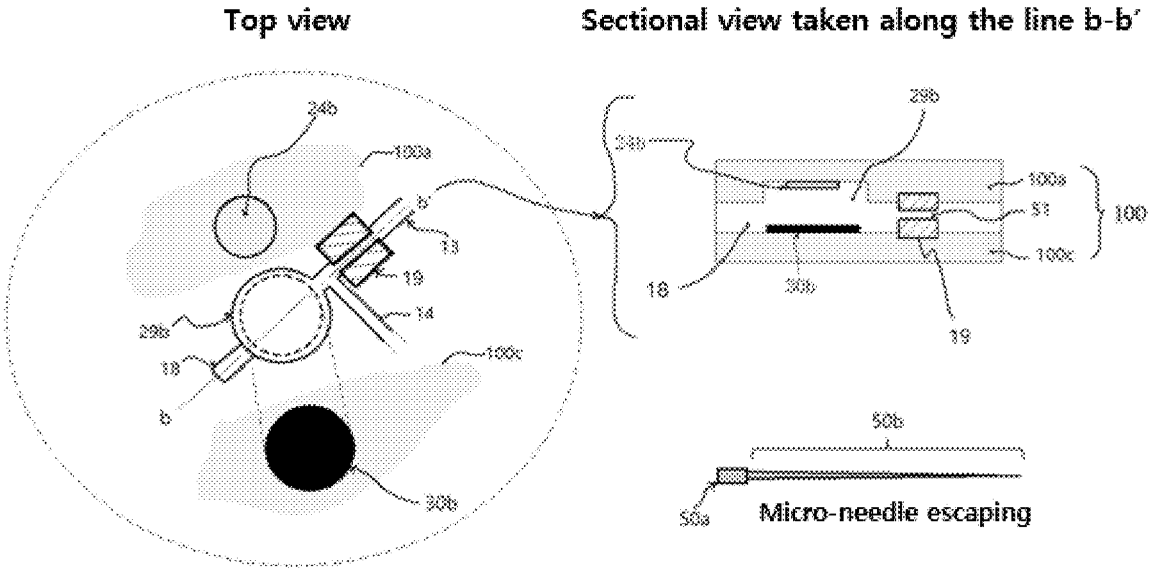

After that, as shown in FIG. 2B, the micro-needle 50*b* escapes from the black thermoplastic resin 19 by means of the strong centrifugal force generated by the rotation of the disc 100 to allow the micro-needle tunnelling channel 51 to be formed in the black thermoplastic resin 19. In specific, the micro-needle 50*b* escapes from the black thermoplastic resin 19 to the outside by means of the centrifugal force, and the micro-needle tunnelling channel 51 is formed at the center of the black thermoplastic resin 19 from which the micro-needle 50*b* escapes. Because the head 50*a* of the micro-needle 50*b* is heavier than the micro-needle 50*b*, the micro-needle 50*b* easily escapes from the black thermoplastic resin 19 by means of the centrifugal force generated by the rotation of the disc 100.

Figure 2C:
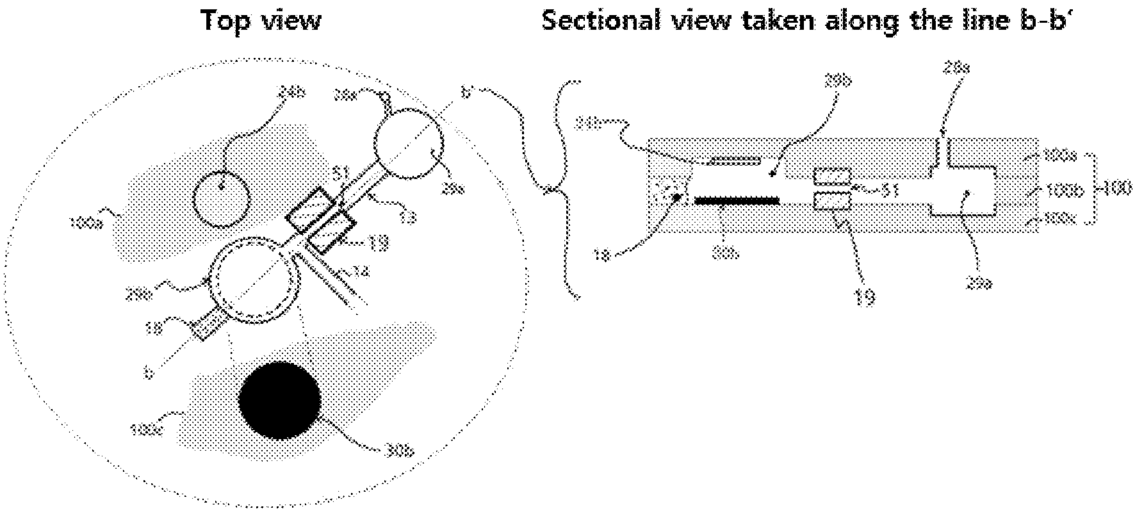
Figure 2D:
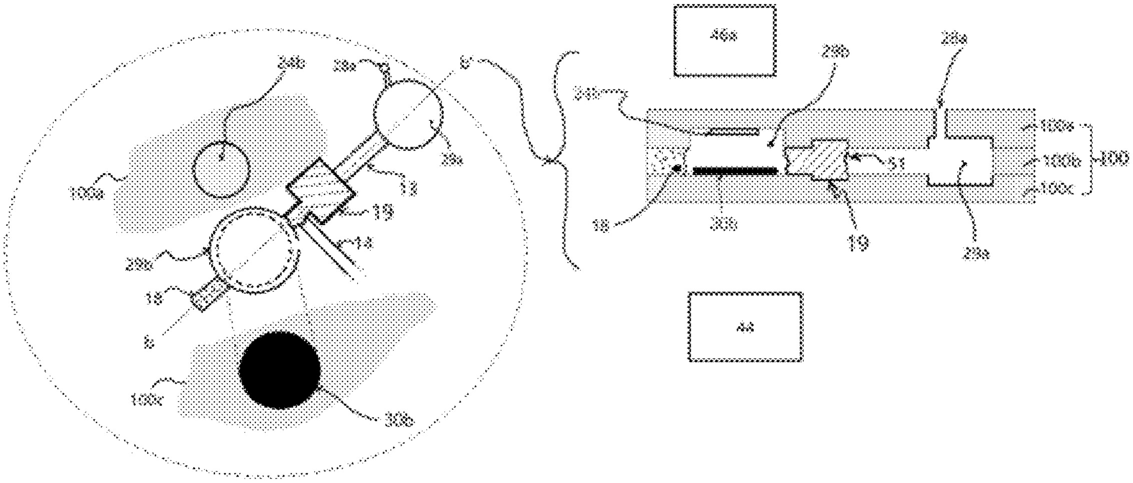

FIGS. 2C and 2D show a series of processes of performing the DNA amplification after the formation of the micro-needle tunnelling channel 51.

FIG. 2C shows processes of sealing the micro-needle outlet 18 by means of UV bonding after the process as shown in FIG. 2B and transferring the sample introduced in the sample chamber 29*a* through the sample inlet 28*a* to the PCR chamber 29*b* via the micro-needle tunnelling channel 51 by means of the centrifugal force generated by the rotation of a motor. In this case, the excess of the sample that is a larger amount than the fixed amount of sample in the PCR chamber 29*b* moves to the excess chamber 15 via the metering channel 14. The UV bonding is desirably carried out by filling a UV adhesive into the micro-needle outlet 18.

FIG. 2D shows a state in which the micro-needle tunnelling channel 51 made of the black thermoplastic resin 19 is melted by means of the laser heating device 44 and closed to allow the sample moving to the PCR chamber 29*b* to be held in the PCR chamber 29*b*, thereby preventing the sample from leaking to the outside due to the high pressure and high heat generated during the DNA amplification.

Before the DNA amplification, that is, as shown in FIGS. 2C and 2D, the sample moves to the PCR chamber 29*b* through the micro-needle tunnelling channel 51 and is thus filled into the PCR chamber 29*b*, and after the excess of the sample over the fixed amount of sample of the PCR chamber 29*b* is transferred to the excess chamber 15, the black thermoplastic resin 19 is melted by the laser heating device 44 to close the micro-needle tunnelling channel 51. Next, the DNA amplification is performed.

The micro-needle tunnelling channel 51 extends long, and if it is closed, a physical closing length becomes long, so that the micro-needle tunnelling channel 51 is resistant to the high temperature and high heat generated from the PCR chamber 29*b*, thereby preventing the sample from leaking to the outside from the PCR chamber 29*b* during the DNA amplification. According to the present invention, desirably, the micro-needle tunnelling channel 51 has a length between 1 and 5 mm.

According to the present invention, the heating film 30*b* desirably is selected from a black film, a metal sheet, a VANTA black sheet, and a graphite sheet.

The metal sheet has one surface coated with black paint or VANTA black and is thus heated by the laser heating device 44. The black coated surface (not shown) absorbs the light generated from the laser heating device 44, transfers the absorbed light to the sample in the PCR chamber 29*b*, and heats the sample. Further, the graphite sheet and the VANTA black sheet have high thermal conductance and are black colors, so that even if they are not coated with the black paint, they may be easily heated by the laser heating device 44.

The reference numeral 24*b* represents the temperature expression member that expresses the internal temperature of the PCR chamber 29*b* to the outside, and desirably, the temperature expression member makes use of an infrared radiation plate or micro-encapsulated temperature sensitive materials.

The PCR disc apparatus according to the present invention desirably includes the non-contact temperature sensor 46*a* disposed above the PCR chamber 29*b* to measure the changes in the transparency and colors of the micro-encapsulated temperature sensitive materials according to the temperature changes of the micro-encapsulated temperature sensitive materials.

According to the present invention, the non-contact temperature sensor 46*a*, which is adapted to measure the changes in the transparency and colors of the micro-encapsulated temperature sensitive materials according to the temperature changes of the micro-encapsulated temperature sensitive materials, is desirably an optical sensor.

Through the optical sensor 46*a* disposed above the PCR chamber 29*b*, the changes in the transparency and colors of the micro-encapsulated temperature sensitive materials are in real time observed to thus measure the internal temperature of the PCR chamber 29*b* in a non-contact way.

Based on the changes in the transparency and colors of the micro-encapsulated temperature sensitive materials that are detected by the optical sensor 46*a*, the feedback control for the driving voltage and current of the laser heating device 44 is performed to thus adjust the internal temperature of the PCR chamber 29*b* to a desired temperature.

The micro-encapsulated temperature sensitive materials are coated in the form of paint on top of the inside of the PCR chamber 29*b* or mixed in the form of spherical granules with the sample of the PCR chamber 29*b*, thereby expressing the temperature value of the PCR chamber 29*b* to the outside. In this case, the changes in the transparency and colors of the micro-encapsulated temperature sensitive materials are detected by the non-contact temperature sensor 46*a*, thereby directly measuring the internal temperature of the PCR chamber 29*b*.

The PCR disc apparatus according to the present invention has the non-contact temperature sensor 46*a* disposed above the PCR chamber 29*b* to measure an amount of infrared light radiated from the infrared radiation plate.

According to the present invention, desirably, the non-contact temperature sensor 46*a*, which is adapted to measure an amount of infrared light radiated from the infrared radiation plate, is an infrared sensor.

In this case, one surface of the infrared radiation plate comes into direct contact with the inside of the PCR chamber 29*b*, and accordingly, the infrared sensor accurately measures the heat generated from the inside of the PCR chamber 29*b*.

Based on the amount of infrared light detected by the infrared sensor, the feedback control for the driving voltage and current of the laser heating device 44 is performed to thus adjust the internal temperature of the PCR chamber 29*b* to a desired temperature.

Figure 3:
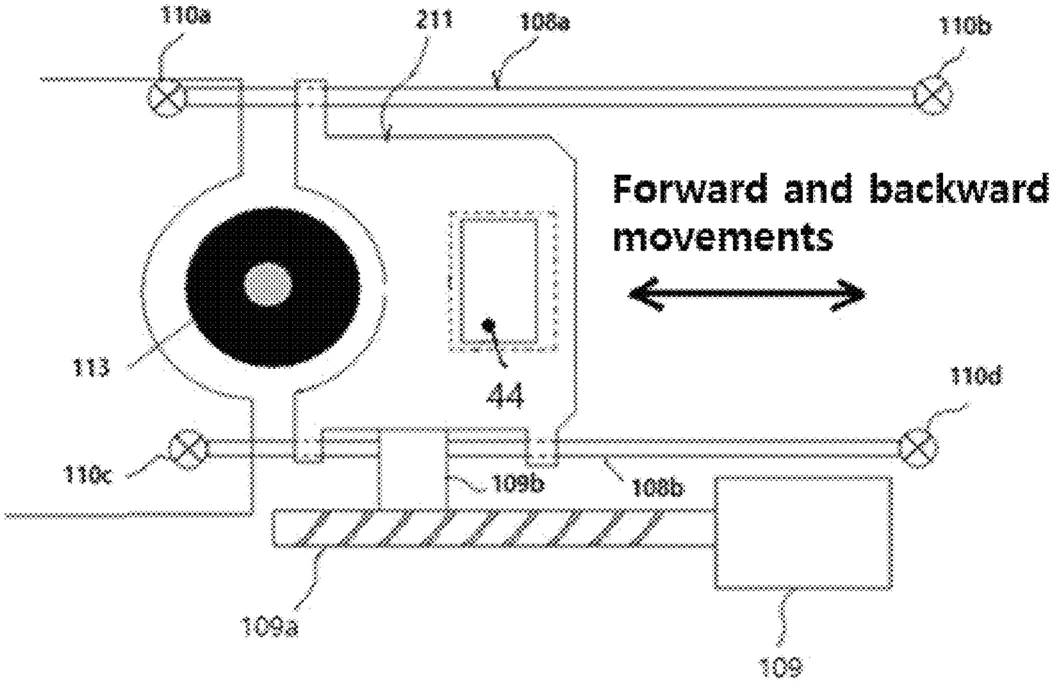
FIG. 3 is an exemplary view showing a state in which as a slider moves forward and backward, the micro-needle tunnelling channel of the disc is closed or a laser heating device for heating the PCR chamber is mounted onto the slider according to the present invention.

FIG. 3 is an exemplary view showing a state in which as a slider 211 moves forward and backward, the micro-needle tunnelling channel 51 of the disc 100 is closed or the laser heating device 44 for heating the PCR chamber 29*b* is mounted onto the slider 211 according to the present invention. Space addressing of the micro-needle tunnelling channel 51 and the PCR chamber 29*b* is possible by means of the rotational angle of the disc 100 and the radial distance adjustment of the slider 211.

The slider 211 moves in a radial direction of the disc 100 by means of worm gear connectors 109*a* and 109*b* connected to a shaft of a step motor 109 according to the rotation of the step motor 109.

The slider 211 slidably moves along slide arms 108*a* and 108*b* according to the rotation of the step motor 109. The slide arms 108*a* and 108*b* are fastened to a body of a driving controller by means of screws 110*a*, 110*b*, 110*c*, and 110*d*. A reference numeral 113 represents a turn table on which the disc 100 is placed.

According to the present invention, the laser heating device 44 is desirably a laser diode, and after the space addressing for the micro-needle tunnelling channel 51 which is desired to be closed is first performed, the laser heating device 44 is turned on to allow the black thermoplastic resin 19 to be melted in such a way as to close the micro-needle tunnelling channel 51.

Figure 4:
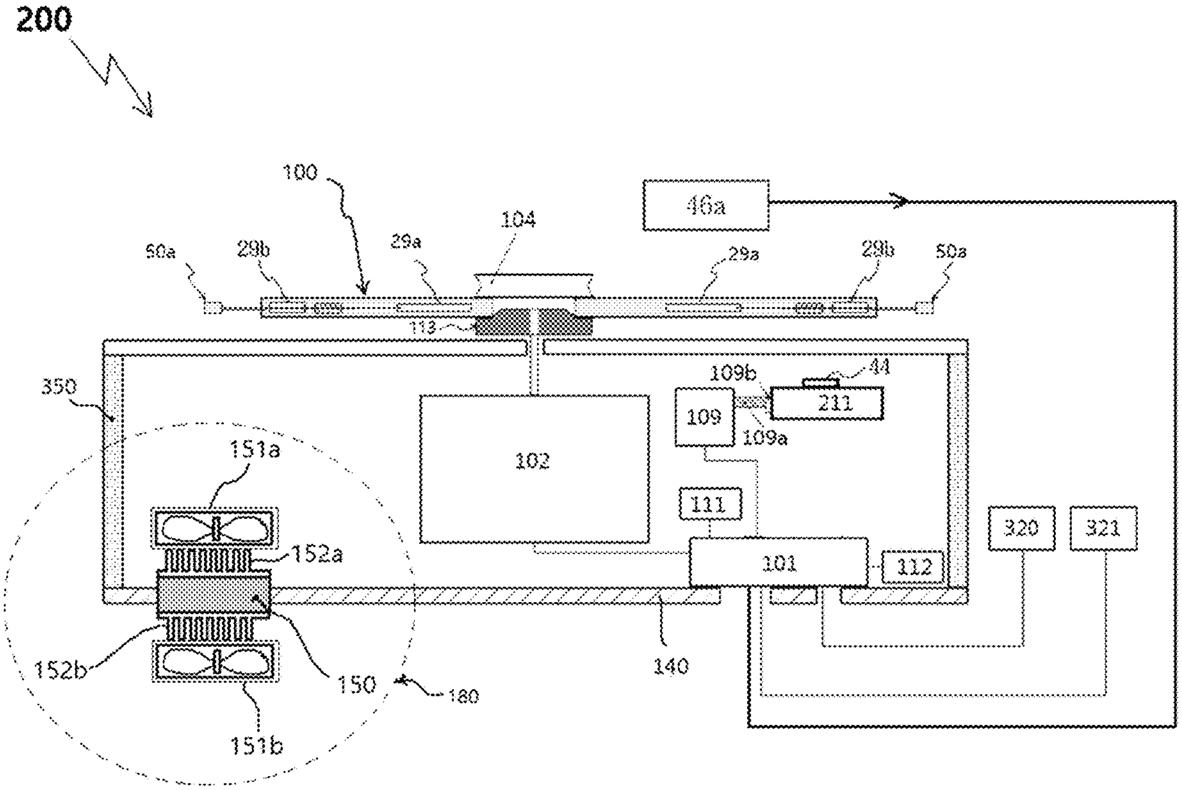
FIG. 4 is a block diagram showing a PCR disc apparatus having a driving controller for driving the PCR disc according to the present invention.

FIG. 4 is a block diagram showing the PCR disc apparatus 200 having the driving controller for driving the PCR disc 100 according to the present invention.

The driving controller includes the turn table 113 for placing the PCR disc 100 thereon, a disc rotation motor 102 for rotating the PCR disc 100 placed on the turn table 113, and a central processing unit 101. According to the present invention, the disc rotation motor 102 is desirably a brushless motor adequate for low noise and high speed rotation.

A reference numeral 211 represents the slider capable of moving in a radial direction, and the movement in the radial direction of the slider 211 is controlled by means of the step motor 109.

According to the PCR disc apparatus 200 as shown in FIG. 4, further, a heating operation of a PCR thermocycle is performed by heating the PCR chamber 29*b* by means of the laser heating device 44, and a cooling operation of the PCR thermocycle is performed by means of a cooling device 180 in which the PCR chamber 29*b* is cooled by the cold air generated from a rotation fan 151*a* connected to the cold surface of a Peltier element 150. A reference numeral 151*b* is a rotation fan connected to the hot surface of the Peltier element 150 to radiate the heat generated from the hot surface of the Peltier element 150 to the outside through the air generated therefrom. A reference numeral 152*a* is a heat sink for connecting the cold surface of the Peltier element 150 and the rotation fan 151*a*, and a reference numeral 152*b* is a heat sink for connecting the hot surface of the Peltier element 150 and the rotation fan 151*b*.

The central processing unit 101 performs the feedback control for the laser heating device 44 and the cooling device 180 to allow the PCR chamber 29*b* to be heated to an optimal temperature at which the DNA amplification is performed. In specific, the central processing unit 101 measures the internal temperature of the PCR chamber 29*b* by means of the non-contact temperature sensor 46*a* and thus performs the feedback control for the laser heating device 44 and the cooling device 180 to allow the PCR chamber 29*b* to be heated to an optimal temperature at which the DNA amplification is performed.

A reference numeral 350 represents a body for supporting the PCR disc apparatus 200. A printed circuit board 140 is disposed on the underside of the PCR disc apparatus 200, while being connectedly fastened to the body 350, and the central processing unit 101, a storage device 112, and an input/output device 111 are arranged on top of the printed circuit board 140. The input/output device 111 remotely provides DNA analysis results for a medical specialist through the Internet. The central processing unit 101 controls the brushless motor 102 to rotate the disc 100 or stop rotating the disc 100, and further, the central processing unit 101 controls the laser heating device 44. Furthermore, the central processing unit 101 controls the step motor 109 to allow the movement of the laser heating device 44 located on the slider 211 to be controlled.

Besides, the central processing unit 101 controls an LCD display part 320 and a button input part 321 to provide a user interface for the PCR disc apparatus 200 for a user.

A reference numeral 104 is a compression member for the disc 100 loaded on the turn table 113 through the disc hole

170 to perform compression through a magnetic attraction to the turn table 113. Desirably, the compression member is allowed to move vertically.

As described above, the PCR disc apparatus according to the present invention is configured to allow the micro-needle tunnelling channels and the different types of chambers to be integratedly arranged on the PCR disc to perform the DNA amplification, so that in a situation such as Coronavirus disease pandemic, the user can perform the PCR analysis of non-face-to-face easily even at home to permit the doctor to remotely check the PCR analysis results.

The disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. For example, the parts expressed in a singular form may be dispersedly provided, and in the same manner as above, the parts dispersed may be combined with each other.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A polymerase chain reaction (PCR) disc apparatus comprising a PCR disc, the PCR disc apparatus comprising:
- a sample chamber;
- a PCR chamber;
- a connection path connected between the sample chamber and the PCR chamber, the connection path extending in a specific direction and having a portion filled with a thermoplastic resin; and
- a micro-needle outlet extending from the PCR chamber to an outer edge of the PCR disc in the specific direction,
- wherein a micro-needle tunnelling channel is formed by a micro-needle built in the thermoplastic resin disposed on an inlet channel of the PCR chamber in such a way as to pass through the thermoplastic resin.

2. The PCR disc apparatus according to claim 1, wherein the micro-needle is built in the interior of the thermoplastic resin melted, the inlet channel of the PCR chamber is filled and hardened, and the micro-needle escapes from the thermoplastic resin by means of a centrifugal force generated by rotation of the PCR disc, so that the micro-needle tunnelling channel is formed on the inlet channel of the PCR chamber.

3. The PCR disc apparatus according to claim 1, wherein the thermoplastic resin is melted through laser heating to allow the micro-needle tunnelling channel to be melted, so that the inlet channel of the PCR chamber is closed.

4. The PCR disc apparatus according to claim 1, further comprising:
- a driving controller having a motor adapted to rotate the PCR disc or stop rotating the PCR disc;
- a laser heating device for heating the PCR chamber; and
- a non-contact temperature sensor for measuring an internal temperature of the PCR chamber.

5. The PCR disc apparatus according to claim 4, further comprising:
- a heating film stored in the PCR chamber to absorb the heat generated from the laser heating device or transfer the absorbed heat to the interior of the PCR chamber; and
- a temperature expressing member for expressing the internal temperature of the PCR chamber through changes in color or emission of infrared light.

6. The PCR disc apparatus according to claim 5, wherein the heating film is selected from the group consisting of a black film, a Vertically Aligned Nano Tube Arrays (VANTA) black sheet, a metal plate with a black coated surface, and a combination thereof.

7. The PCR disc apparatus according to claim 5, wherein the temperature expressing member is selected from the group consisting of micro-encapsulated temperature sensitive materials, an infrared radiation plate, and a combination thereof.

8. The PCR disc apparatus according to claim 7, wherein the non-contact temperature sensor is any one selected from an image sensor for detecting changes in transparency and colors of the micro-encapsulated temperature sensitive materials and an infrared sensor for detecting an amount of infrared light emitted from the infrared radiation plate.

9. The PCR disc apparatus according to claim 1, wherein the PCR disc further comprises:
- a sample inlet for introducing a sample;
- the sample chamber connected to the sample inlet to temporarily store the sample; and
- an excess chamber for storing the excess of the sample exceeding a fixed amount of the sample of the PCR chamber.

10. The PCR disc apparatus according to claim 4, further comprising:
- the laser heating device for closing the micro-needle tunnelling channel or heating the PCR chamber; and
- a slider movable in a radial direction of the PCR disc.

11. The PCR disc apparatus according to claim 1, further comprising peptide nucleic acid (PNA) probes disposed in the PCR chamber in such a way as to be coupled to deoxyribonucleic acid (DNA) having normal target sequence and not coupled to DNA having mutated target sequence, whereby the normal target DNA coupled to PNA are not amplified and the mutated target DNA not coupled to the PNA are amplified during the PCR amplification to thus determine whether a disease exists and a mutation occurs.

12. The PCR disc apparatus according to claim 1, wherein the thermoplastic resin is black thermoplastic resin.

13. The PCR disc apparatus according to claim 1, wherein the micro-needle passes through the micro-needle outlet, the PCR chamber, a first portion of the connection path, and the thermoplastic resin in the specific direction and extends into a second portion of the connection path in the specific direction, the thermoplastic resin disposed between the first and second portions of the connection path.

14. The PCR disc apparatus according to claim 13, wherein the specific direction is a radial direction of the PCR disc, and the micro-needle tunneling channel in the thermoplastic resin extends in the radial direction.

15. The PCR disc apparatus according to claim 9, wherein the PCR disc further comprises a metering channel connected between the connection path and the excess chamber,
- wherein the portion of the connection path in which the thermoplastic resin fills is located between the sample chamber and a junction between the metering channel and the connection path.

16. The PCR disc apparatus according to claim 1, wherein the connection path is directly connected to the sample chamber and the PCR chamber.

* * * * *